US009583104B2

(12) United States Patent
Landry et al.

(10) Patent No.: US 9,583,104 B2
(45) Date of Patent: *Feb. 28, 2017

(54) SUGGESTING INTENT FRAME(S) FOR USER REQUEST(S)

(71) Applicant: Microsoft Technology Licensing, LLC, Redmond, WA (US)

(72) Inventors: Shane J. Landry, Woodinville, WA (US); Anne K. Sullivan, San Francisco, CA (US); Lisa J. Stifelman, Palo Alto, CA (US); Adam D. Elman, Sunnyvale, CA (US); Larry Paul Heck, Los Altos, CA (US); Sarangarajan Parthasarathy, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,377

(22) Filed: Nov. 29, 2015

(65) Prior Publication Data

US 2016/0078868 A1    Mar. 17, 2016

Related U.S. Application Data

(63) Continuation of application No. 13/327,305, filed on Dec. 15, 2011, now Pat. No. 9,201,859.

(51) Int. Cl.
*G06F 17/27* (2006.01)
*G10L 15/22* (2006.01)
*G10L 13/06* (2013.01)

(52) U.S. Cl.
CPC ............ *G10L 15/22* (2013.01); *G06F 17/27* (2013.01); *G06F 17/2775* (2013.01); *G10L 13/06* (2013.01)

(58) Field of Classification Search
USPC ................................. 704/7–9, 257
See application file for complete search history.

(56) References Cited

U.S. PATENT DOCUMENTS 6,567,778 B1    5/2003  Chao Chang et al.
6,598,018 B1    7/2003  Junqua
(Continued)

OTHER PUBLICATIONS

"Fill-in-the-Blanks", Retrieved from <<http://designinginterfaces.com/firstedition/index.php?page=Fill-in-the-Blanks>>, Retrieved on: Dec. 1, 2011, 1 Page.

(Continued)

*Primary Examiner* — Leonard Saint Cyr
(74) *Attorney, Agent, or Firm* — Steven J. Spellman; Tom Wong; Micky Minhas

(57) ABSTRACT

Techniques are described herein that are capable of suggesting intent frame(s) for user request(s). For instance, the intent frame(s) may be suggested to elicit a request from a user. An intent frame is a natural language phrase (e.g., a sentence) that includes at least one carrier phrase and at least one slot. A slot in an intent frame is a placeholder that is identified as being replaceable by one or more words that identify an entity and/or an action to indicate an intent of the user. A carrier phrase in an intent frame includes one or more words that suggest a type of entity and/or action that is to be identified by the one or more words that may replace the corresponding slot. In accordance with these techniques, the intent frame(s) are suggested in response to determining that natural language functionality of a processing system is activated.

20 Claims, 8 Drawing Sheets

(56) References Cited

U.S. PATENT DOCUMENTS

| | | | |
|---|---|---|---|
| 7,512,537 | B2 | 3/2009 | Pahud et al. |
| 7,689,410 | B2 | 3/2010 | Chang et al. |
| 7,966,282 | B2 | 6/2011 | Pinckney et al. |
| 7,979,798 | B2 | 7/2011 | Wadhwa |
| 8,335,683 | B2 | 12/2012 | Acero et al. |
| 2005/0273336 | A1 | 12/2005 | Chang et al. |
| 2007/0226376 | A1* | 9/2007 | Konno ................. G06F 3/0481 710/5 |
| 2008/0294637 | A1 | 11/2008 | Liu |
| 2009/0282033 | A1 | 11/2009 | Alshawi |
| 2010/0004924 | A1 | 1/2010 | Paez |
| 2011/0257961 | A1 | 10/2011 | Tinkler et al. |
| 2011/0307435 | A1 | 12/2011 | Overell et al. |

OTHER PUBLICATIONS

"Final Office Action Issued in U.S. Appl. No. 13/327,305", Mailed Date: Jul. 2, 2014, 11 Pages.

"Final Office Action issued in U.S. Appl. No. 13/327,305", Mailed Date: Apr. 22, 2015, 14 Pages.

"Non-Final Office Action issued in U.S. Appl. No. 13/327,305", Mailed Date: Feb. 10, 2014, 11 Pages.

"Non-Final Office Action issued in U.S. Appl. No. 13/327,305", Mailed Date: Nov. 6, 2014, 12 Pages.

"Notice of Allowance Issued in U.S. Appl. No. 13/327,305", Mailed Date: Jul. 29, 2015, 9 Pages.

Jacob, Robert J.K., "User Interfaces", Retrieved from <<http://web.media.mit.edu/~anjchang/ti01/rjp.html>>, Encyclopedia of Computer Science, Fourth Edition, 2000, 7 Pages.

\* cited by examiner

SUGGESTING INTENT FRAME(S) FOR USER REQUEST(S)

CROSS-REFERENCE TO RELATED APPLICATION(S)

This application is a continuation of U.S. patent application Ser. No. 13/327,305 (now U.S. Pat. No. 9,201,859), filed Dec. 15, 2011, the entirety of which is incorporated by reference herein.

BACKGROUND

Natural language systems are systems that are capable of processing natural language requests. A natural language system typically includes an interface via which users provide such natural language requests. For instance, a natural language request may be a freeform input (e.g., to search for information, to perform a task, to ask a question, etc.). Users often encounter difficulty in understanding the types of requests and actions that are supported by natural language systems because the natural language systems often are not configured to convey such information to the users. For instance, users may be unsure how broad or narrow a natural language request may be and still remain within the processing capabilities of a natural language system. Users may be unable to understand whether it is possible and/or preferable to provide naturally formatted requests (e.g., "I'd like to see movies with Brad Pitt"), as opposed to programmatically formatted requests (e.g., "Movies, actor, Brad Pitt"). Users may be unable to discover new requests or actions to obtain the same or new outcomes. Users may not be able to clearly understand when requests should be confined to contextually significant domains versus being able to ask for anything they want at any time.

In an effort to address some of these difficulties, some conventional natural language systems are configured to provide textual examples of requests that the systems are capable of processing and/or brief tutorials regarding the capabilities of the systems. However, such examples and tutorials usually result in encouraging the users to merely repeat examples verbatim, rather than modifying the examples to achieve the intent of the users. Moreover, the examples typically are static and may not be relevant to the intent of the users. For instance, a user may provide successive requests to a natural language system to generate a dialog with the system, such that the context of the dialog changes with each successive request.

SUMMARY

Various approaches are described herein for, among other things, suggesting intent frame(s) for user request(s). For instance, the intent frame(s) may be suggested to elicit a request from a user. An intent frame is a natural language phrase (e.g., a sentence) that includes at least one carrier phrase and at least one slot. A slot in an intent frame is a placeholder that is identified as being replaceable by one or more words that identify an entity and/or an action to indicate a corresponding intent. A carrier phrase in an intent frame includes one or more words that suggest a type of entity and/or action that is to be identified by the one or more words that may replace the corresponding slot.

A method is described in which a determination is made that natural language functionality of a processing system is activated to enable the processing system to interpret natural language requests. Intent frame(s) are suggested that are to be provided via an interface of the processing system for a user in response to the determination that the natural language functionality is activated. Each of the intent frame(s) includes carrier phrase(s) and slot(s).

Another method is described. In accordance with this method, a request is received from a user at a processing system having natural language functionality that enables the processing system to interpret natural language requests. A domain and/or an intent of the request is determined. Intent frame(s) are suggested that are to be provided via an interface of the processing system for the user in response to the request from the user. Each of the intent frame(s) is based on the domain and/or the intent. Each of the intent frame(s) includes respective carrier phrase(s) and respective slot(s).

A processing system is described that includes activation logic, suggestion logic, and an interface. The activation logic is configured to determine whether natural language functionality of the processing system is activated. The natural language functionality is for enabling the processing system to interpret natural language requests. The suggestion logic is configured to generate intent frame(s) in response to a determination that the natural language functionality of the processing system is activated. Each of the intent frame(s) includes carrier phrase(s) and slot(s). The interface is configured to provide the intent frame(s) for perception by a user.

Another processing system is described. The processing system has natural language functionality that enables the processing system to interpret natural language requests. The processing system includes request analysis logic, suggestion logic, and an interface. The request analysis logic is configured to determine a domain and/or an intent of a request that is received from a user. The suggestion logic is configured to generate intent frame(s) in response to the request from the user. Each of the intent frame(s) is based on the domain and/or the intent. Each of the intent frame(s) includes carrier phrase(s) and slot(s). The interface is configured to provide the intent frame(s) for perception by the user.

A computer program product is described that includes a computer-readable medium having computer program logic recorded thereon for enabling a processor-based system to suggest intent frame(s) for user request(s). The computer program product includes first and second program logic modules. The first program logic module is for enabling the processor-based system to determine that natural language functionality of a processing system is activated to enable the processing system to interpret natural language requests. The second program logic module is for enabling the processor-based system to suggest intent frame(s) that are to be provided via an interface of the processing system for a user in response to a determination that the natural language functionality is activated. Each of the intent frame(s) includes carrier phrase(s) and slot(s).

Another computer program product is described that includes a computer-readable medium having computer program logic recorded thereon for enabling a processor-based system to suggest intent frame(s) for user request(s). The processing system has natural language functionality that enables the processing system to interpret natural language requests. The computer program product includes first and second program logic modules. The first program logic module is for enabling the processor-based system to determine a domain and/or an intent of a request that is received from a user. The second program logic module is for enabling the processor-based system to suggest intent frame(s) that are to be provided via an interface of the processing system for the user in response to the request from the user. Each of the intent frame(s) is based on the domain and/or the intent. Each of the intent frame(s) includes carrier phrase(s) and slot(s).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
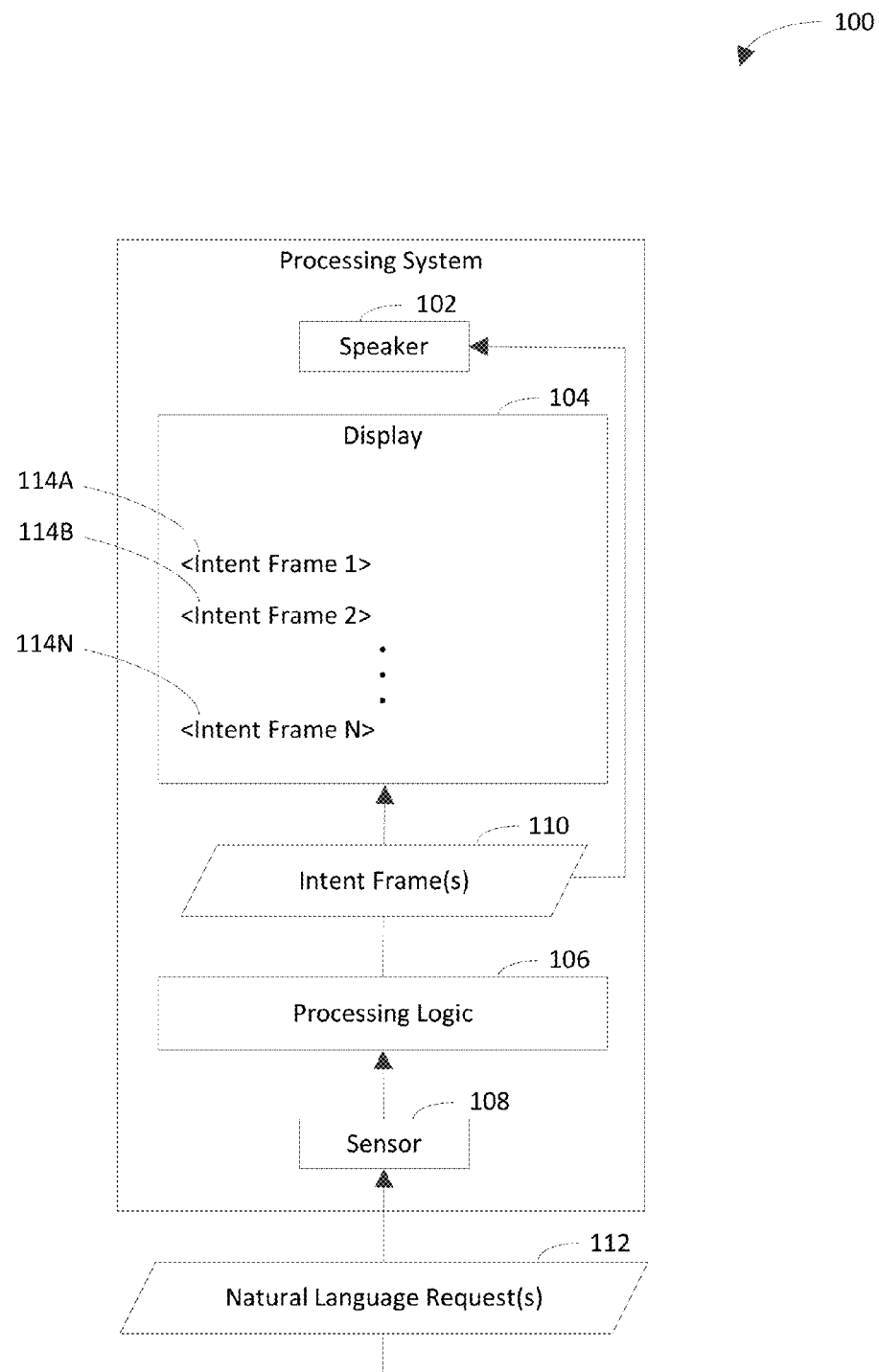
FIG. 1 is a block diagram of an example processing system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of suggesting intent frame(s) for user request(s). For instance, the intent frame(s) may be suggested to elicit a request from a user. An intent frame is a natural language phrase (e.g., a sentence) that includes at least one carrier phrase and at least one slot. A slot in an intent frame is a placeholder that is identified as being replaceable by one or more words that identify an entity and/or an action to indicate a corresponding intent. A carrier phrase in an intent frame includes one or more words that suggest a type of entity and/or action that is to be identified by the one or more words that may replace the corresponding slot.

For instance, the intent frame "I want reservations for _____ at _____" includes two carrier phrases and two slots. A first carrier phrase, "I want reservations for," is followed by a first slot, "_____". A second carrier phrase, "at" is followed by a second slot, "_____". In one example, the first carrier phrase may suggest that a number of people is to be identified by the word(s) that replace the first slot. In accordance with this example, the second carrier phrase may suggest that a time, a type of establishment (e.g., restaurant, theater, etc.), or a name of an establishment (e.g., Three Forks, National Theatre, etc.) is to be identified by the word(s) that replace the second slot. In another example, the first carrier phrase may suggest that a type of establishment or a name of an establishment is to be identified by the word(s) that replace the first slot. In accordance with this example, the second carrier phrase may suggest that a time is to be identified by the word(s) that replace the second slot. In yet another example, the first carrier phrase may suggest that a time is to be identified by the word(s) that replace the first slot. In accordance with this example, the second carrier phrase may suggest that a type of establishment or a name of an establishment is to be identified by the word(s) that replace the second slot. It is noted that the concepts of "intent frame," "slot," and "carrier phrase" are well-known in the area of linguistics.

Example techniques described herein have a variety of benefits as compared to conventional natural language techniques. For instance, the intent frame(s) that are suggested to a user may indicate one or more types of requests and/or actions that are supported by a natural language system. The intent frame(s) may indicate how broad or narrow a natural language request may be while remaining within the processing capabilities of the natural language system. The intent frame(s) may indicate a possibility and/or preference for a processing system to process natural language requests, as opposed to programmatically formatted requests. The intent frame(s) may help users discover new requests and/or actions to obtain the same or new outcomes. The intent frame(s) may indicate whether requests are to be confined to contextually significant domains. The example techniques may encourage a user to extend and/or extrapolate with respect to carrier phrase(s) and/or slot(s) in an intent frame to achieve an intent of the user. The example techniques may reduce cognitive load on a user because the user can more easily map from the intent frame(s) to the user's request when the user does not have something specific in mind already. In embodiments where intent frame(s) are generated for a specific context, the example techniques may help to suggest the best and/or most likely next step(s).

FIG. 1 is a block diagram of an example processing system 100 in accordance with an embodiment. An example of a processing system is a system that includes at least one processor that is capable of manipulating data in accordance with a set of instructions. For instance, a processing system may be a computer (e.g., a desktop computer, a laptop computer, a tablet computer, etc.), a personal digital assistant, a cellular telephone, a television, a game console (e.g., an Xbox® developed by Microsoft Corporation, a Playstation® developed by Sony Corporation, or a WHO developed by Nintendo), etc.

Generally speaking, processing system 100 operates to suggest intent frame(s) for user request(s). Processing system 100 includes a speaker 102, a display 104, processing logic 106, and a sensor (e.g., a microphone, a tactile sensor, etc.) 108. Processing logic 106 is configured to generate intent frame(s) 110. Each of the intent frame(s) 110 is an example of a natural language phrase that may be provided (e.g., spoken, entered by touch, etc.) by a user via sensor 108 as a request for interpretation by processing logic 106. Processing logic 106 may generate the intent frame(s) based on any of a variety of factors, including but not limited to information regarding request(s) from the user, content that is provided to the user, preference(s) of the user, a context of an interaction with the user, etc. For example, the context of the interaction with the user may be monitored by a dialog manager or other type of manager. For instance, a dialog manager may determine the context of the interaction with the user based on topics that are accessed by the user with respect to a software application. Dialog managers and corresponding context monitoring techniques are known in the relevant art(s) and are not discussed in further detail herein.

Processing logic 106 provides the intent frame(s) 110 toward the user via an interface, such as display 104 and/or speaker 102. Upon providing the intent frame(s) 110, processing logic 106 monitors sensor 108 to determine whether natural language request(s), such as natural language request(s) 112, are received at sensor 108. Upon determining that a natural language request is received at sensor 108, processing logic 106 performs operations for achieving an intent of the user based on the intent being indicated by the natural language request.

Display 104 is configured to provide visual representation(s) 114A-114N of the respective intent frame(s) 110. For instance, display 104 is shown in FIG. 1 to display a first intent frame using a first visual representation 114A labeled "<Intent frame 1>", a second intent frame using a second visual representation 114B labeled "<Intent frame 2>", and so on. Accordingly, each carrier phrase and each slot in the intent frame(s) 110 is visually represented among the visual representation(s) 114A-114N. For instance, each slot in an intent frame may be visually represented as a blank space, an underlined space, underlined text, blinking text, or in another manner that visually distinguishes the slot from carrier phrase(s) in the intent frame. Example visual representations of intent frames are discussed in further detail below with reference to FIGS. 4-7.

Speaker 102 is configured to provide an audio representation of each of the intent frame(s) 110 generated by processing logic 106. For instance, each slot in an intent frame may be audibly represented using spoken word(s) and/or tone(s), such as a constant tone (e.g., a beep) or a varying tone. In an example, at least one slot is audibly represented using one or more tones in lieu of spoken word(s). In another example, at least one slot is audibly represented using one or more spoken words in lieu of tone(s). In yet another example, at least one slot is audibly represented using tone(s) overlaid on spoken word(s).

Sensor 108 is configured to receive natural language request(s), such as natural language requests) 112, that are provided by a user. Sensor may be an audio sensor, a tactile sensor, a gyroscopic sensor, other type of sensor, or any combination thereof. For instance, sensor 108 may receive the natural language requests) as natural language speech input, natural language textual input, a combination of speech and touch input, a combination of speech and gesture input, etc. Examples of a gesture input include but are not limited to a hand being waved (perhaps in a specified manner) in front of a camera, facial expression being made, an object being touched on a display, the processing system being placed proximate an ear of the user, etc. For instance, sensor 108 may include a gyroscope and/or an accelerometer to detect movement and/or lack thereof, an infrared detector to detect proximity of the infrared detector to another object, and/or a light meter to detect presence and/or absence of light for determining whether the processing system is being placed proximate an ear of the user. One example of a combination of speech and touch input is an object on a display being touched and a voice command of "send this to Lisa". The natural language requests) may be received by sensor 108 in response to provision of the intent frame(s) 110 toward the user by processing logic 106, though the scope of the example embodiments is not limited in this respect.

Processing logic 106 may be implemented in various ways to suggest intent frame(s) for user request(s), including being implemented in hardware, software, firmware, or any combination thereof. For example, processing logic 106 may be implemented as computer program code configured to be executed in one or more processors. In another example, processing logic 106 may be implemented as hardware logic/electrical circuitry. In an embodiment, processing logic 106 may be implemented in a system-on-chip (SoC). Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 2:
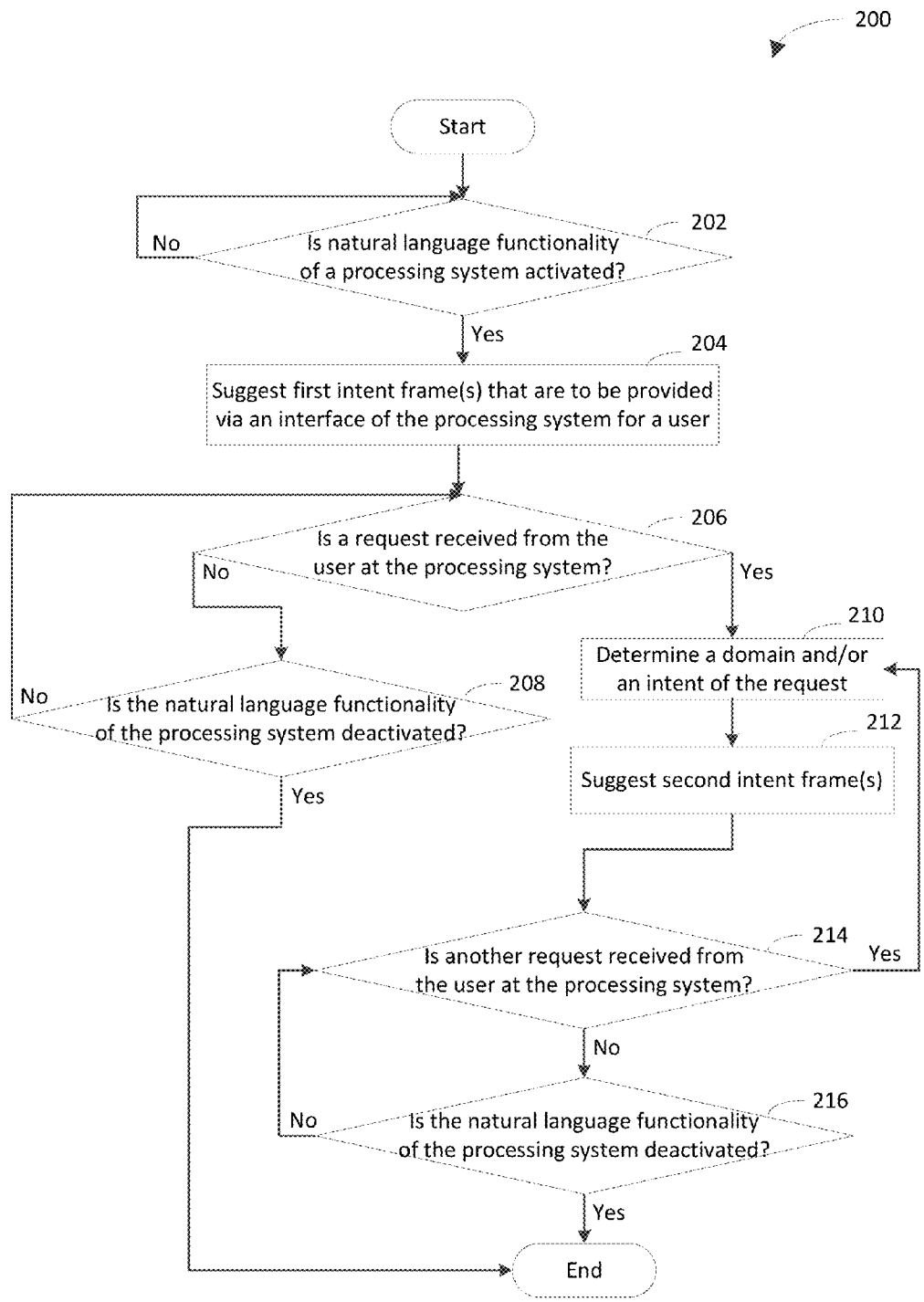
FIG. 2 depicts a flowchart of an example method for suggesting intent frame(s) for user request(s) in accordance with an embodiment.
Figure 3:
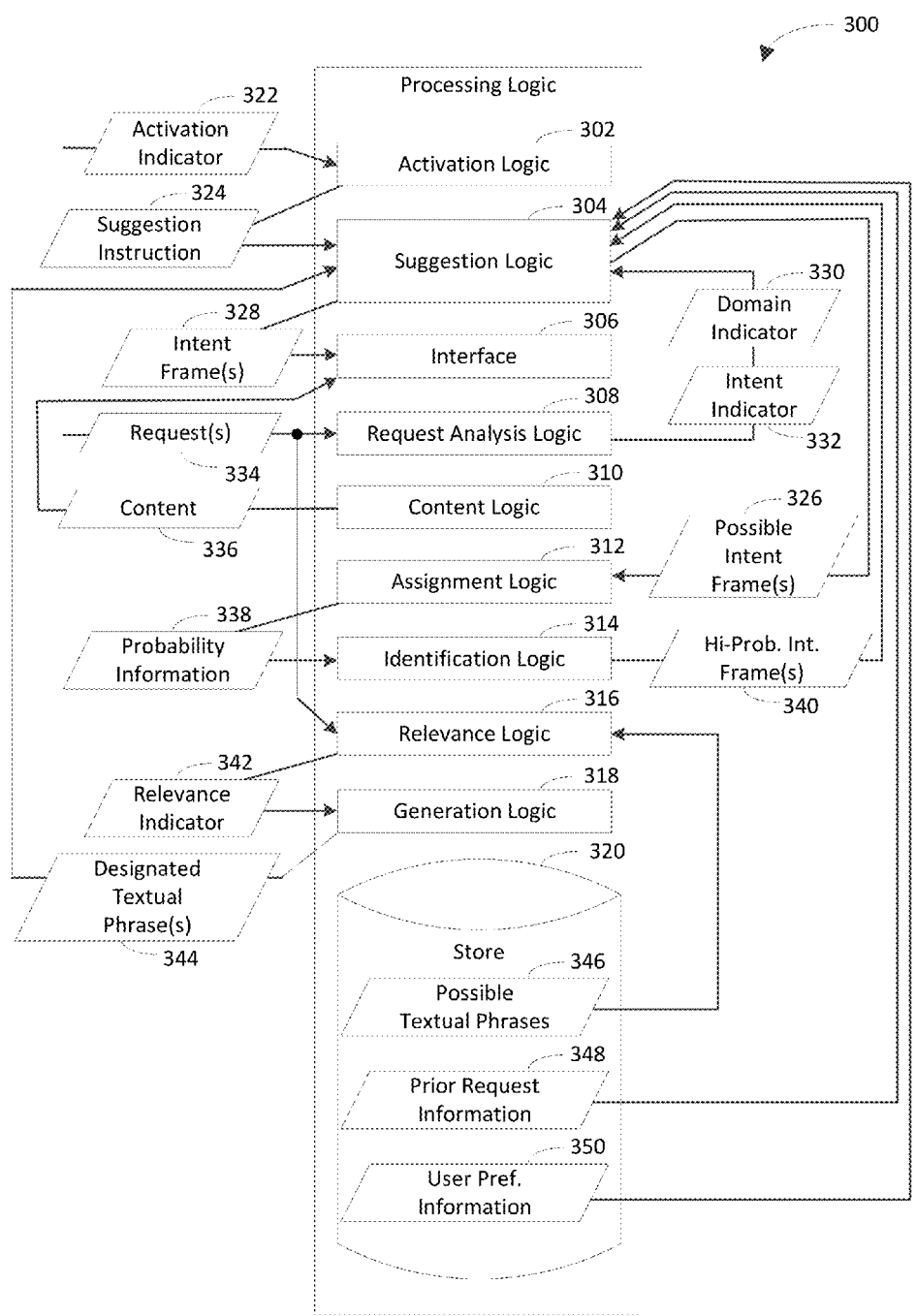
FIG. 3 is a block diagram of an example implementation of processing logic shown in FIG. 1 in accordance with an embodiment.

FIG. 2 depicts a flowchart 200 of an example method for suggesting intent frame(s) for user request(s) in accordance with an embodiment. Flowchart 200 may be performed by processing logic 106 of processing system 100 shown in FIG. 1, for example. For illustrative purposes, flowchart 200 is described with respect to a processing logic 300 shown in FIG. 3, which is an example of processing logic 106, according to an embodiment. As shown in FIG. 3, processing logic 300 includes time logic 302, suggestion logic 304, interface 306, request analysis logic 308, content logic 310, assignment logic 312, identification logic 314, relevance logic 316, generation logic 318, and store 320. Further structural and operational embodiments will be apparent to persons skilled in the relevant art(s) based on the discussion regarding flowchart 200.

As shown in FIG. 2, the method of flowchart 200 begins at step 202. In step 202, a determination is made whether natural language functionality of a processing system is activated. The natural language functionality is for enabling the processing system to interpret natural language requests (e.g., request(s) 334). If the natural language functionality of the processing system is activated, flow continues to step 204. Otherwise, flow returns to step 202. In an example implementation, activation logic 302 determines whether the natural language functionality of the processing system is activated. For example, activation logic 302 may determine that the natural language functionality is activated based on receipt of activation indicator 322. In accordance with this example, activation indicator 322 may indicate that the natural language functionality is activated. In further accordance with this example, activation logic 302 may generate a suggestion instruction 324 that instructs suggestion logic 304 to suggest first intent frame(s) based on a determination that the natural language functionality is activated.

In accordance with an example embodiment, step 202 includes determining whether an operation for activating the natural language functionality is performed. Examples of such an operation include but are not limited to selecting an interface element (e.g., an icon, a physical button, a virtual button, etc.) that is configured to control operability of the natural language functionality with respect to the processing system, selecting (e.g., clicking on, double-clicking, providing a voice command to select, etc.) an item of content that is displayed to the user, launching a software application, placing the processing system proximate an ear of the user, viewing a display of the processing system by the user, providing a voice command that instructs the processing system to activate the natural language functionality, gesturing and/or touching the display in a manner that is associated with activation of the natural language functionality, etc.

At step 204, first intent frame(s) are suggested that are to be provided via an interface of the processing system for a user. Each of the first intent frame(s) includes at least one carrier phrase and at least one slot. The first intent frame(s) may be provided to elicit a request from the user. For instance, each slot may be replaceable by the user to achieve an intent of the user. In an example implementation, suggestion logic 304 suggests the first intent frame(s) for provision via interface 306. For instance, the first intent frame(s) may be included in intent frame(s) 328 shown in FIG. 3. In accordance with this implementation, interface 306 is configured to provide the first intent frame(s) for perception by the user. Interface 306 may include a display (e.g., display 104 of FIG. 1), a speaker (e.g., speaker 102 of FIG. 1), other suitable type(s) of interface, or any combination thereof.

In an example embodiment, at least one of the first intent frame(s) includes one or more slots that do not include text. For instance, a slot that does not include text may be represented as a blank (e.g., " ") or as an underlined blank (e.g., "_____"). Some example intent frames having slots that do not include text are discussed below with reference to FIGS. 4 and 8.

In another example embodiment, at least one of the first intent frame(s) includes one or more slots that include text. The text in each slot of an intent frame is distinguishable from text in the carrier phrase(s) of the intent frame. For instance, the text in a slot may be bolded, underlined, italicized, a larger or smaller font as compared to the text in the carrier phrase(s), shaded, not along a common axis with the text in the carrier phrase(s), a color that is different from a color of the text in the carrier phrase(s), etc. Some example intent frames having slots that include text are discussed below with reference to FIGS. 5, 7, and 8.

In yet another example embodiment, multiple suggested textual phrases are provided to replace a designated slot in a specified intent frame that is included in the first intent frame(s). For instance, each suggested textual phrase specifies an entity, a category of entities, an action, a category of actions, etc. Some example intent frames having slots for which multiple suggested textual phrases are provided are discussed below with reference to FIG. 6.

At step 206, a determination is made whether a request is received from the user at the processing system. If a request is received from the user at the processing system, flow continues to step 210. Otherwise, flow continues to step 208. In an example implementation, request analysis logic 308 determines whether a request (e.g., request(s) 334) is received from a user at the processing system.

At step 208, a determination is made whether the natural language functionality of the processing system is deactivated. If the natural language functionality of the processing system is deactivated, flowchart 200 ends. Otherwise, flow returns to step 206. In an example implementation, activation logic 302 determines whether the natural language functionality of the processing system is deactivated.

At step 210, a domain and/or an intent of the request is determined. Examples of a domain include but are not limited to restaurants, weather, movies, traffic, sports, directions, tickets, events, etc. Examples of intent include but are not limited to "schedule a meeting", "buy a movie ticket", "find a movie showtime", "get directions etc. In an example implementation, request analysis logic 308 determines the domain and/or the intent of the request. For instance, request analysis logic 308 may analyze content of the request and/or metadata associated with the request to determine the domain and/or the intent of the request. In accordance with this implementation, upon determining the domain of the request, request analysis logic 308 may generate a domain indicator 330 that specifies the domain of the request. Upon determining the intent of the request, request analysis logic 308 may generate an intent indicator 332 that specifies the intent of the request.

At step 212, second intent frame(s) are suggested in response to the request from the user. Each of the second intent frame(s) is based on the domain and/or the intent that is determined at step 210. Each of the second intent frame(s) includes at least one respective carrier phrase and at least one respective slot. In an example implementation, suggestion logic 304 suggests the second intent frame(s). For instance, the second intent frame(s) may be included in intent frame(s) 328. In accordance with this implementation, interface 306 is configured to provide the second intent frame(s).

In an example embodiment, at least one of the second intent frame(s) is further based on information regarding one or more prior requests from the user. The one or more prior requests precede the request in response to which second intent frame(s) are suggested. For instance, store 320 may store prior request information 348. The prior request information 348 may include the information regarding the prior request(s) from the user.

In another example embodiment, content is provided to the user based on the request. The content may include documents (e.g., Web pages, images, video files, etc.), output of executables, and/or any other suitable type of content. For instance, if the request includes a search query, the content may include search results that correspond to the search query. In accordance with this embodiment, at least one of the second intent frame(s) is further based on the content. For instance, content logic 310 may provide content 336 to the user via interface 306 based on the request.

In yet another example embodiment, at least one of the second intent frame(s) is further based on one or more preferences of the user. Examples of a preference of the user include but are not limited to a contact that is specified in a virtual address book of the user (e.g., based on a usage pattern of the user, such as a number of times or a frequency with which the user accesses information associated with the contact), a video (e.g., a movie) that the user has watched, an audio clip (e.g., a song) to which the user has listened, a favorite establishment of the user (e.g., an establishment most frequently visited by the user) within a specified category (e.g., restaurants, theaters, retail stores, etc.) of establishments, a favorite conference room of the user, a type of food or a specified dish that the user likes to eat, a geographical region of the user (e.g., a geographical region in which the user lives, works, and/or visits more often than other geographical regions), etc. For instance, store 320 may store user preference information 350. The user preference information 350 may include the information regarding the preference(s) of the user.

At step 214, a determination is made whether another request is received from the user at the processing system. If another request is received from the user at the processing system, flow returns to step 210. Otherwise, flow continues to step 216. In an example implementation, request analysis logic 308 determines whether another request is received from the user at the processing system.

At step 216, a determination is made whether the natural language functionality of the processing system is deactivated. If the natural language functionality of the processing system is deactivated, flowchart 200 ends. Otherwise, flow returns to step 214. In an example implementation, activation logic 302 determines whether the natural language functionality of the processing system is deactivated.

In some example embodiments, one or more steps 202, 204, 206, 208, 210, 212, 214, and/or 216 of flowchart 200 may not be performed. Moreover, steps in addition to or in lieu of steps 202, 204, 206, 208, 210, 212, 214, and/or 216 may be performed. For instance, in an example embodiment, the method of flowchart 200 includes assigning probabilities to respective possible intent frames. Each probability indicates a likelihood that the user is to select the corresponding possible intent frame if the corresponding possible intent frame is suggested to the user. For example, assignment logic 312 may assign probabilities to respective possible intent frame(s) 326. In accordance, assignment logic 312 may receive the possible intent frame(s) 326 from suggestion logic 304. Assignment logic 312 may generate probability information 338 to include the probabilities that are assigned to the respective possible intent frame(s) 326.

In accordance with this embodiment, the method further includes identifying a high-probability intent frame from the possible intent frames. The high-probability intent frame is assigned a probability that is not less than a probability that is assigned to each other possible intent frame. For instance, identification logic 314 may identify high-probability intent frame(s) 340 from the possible intent frame(s) 326 based on the probability information 338.

In further accordance with this embodiment, the high-probability intent frame is included in the second intent frame(s) based on the high-probability intent frame being assigned a probability that is not less than a probability that is assigned to each other possible intent frame. For instance, suggestion logic 304 may include the high-probability intent frame(s) 340 in the second intent frame(s).

In another example embodiment, the second intent frame(s) include a specified second intent frame that includes a specified second slot. In accordance with this embodiment, the method of flowchart 200 includes determining a relevance of each of a plurality of possible textual phrases with regard to the request from the user. In an example implementation, relevance logic 316 determines the relevance of each of the possible textual phrases 346. Store 320 is shown to store the possible textual phrases 346 for illustrative purposes and is not intended to be limiting. In accordance with this implementation, relevance logic 316 generates a relevance indicator 342 that indicates the relevance of each of the possible textual phrases 346.

The relevance of each of the plurality of possible textual phrases may be a temporal relevance, a personal relevance, other suitable type(s) of relevance, or any combination thereof. Temporal relevance is dependent on time. For instance, a textual phrase may become less relevant as time passes. For example, a textual phrase corresponding to a newly released movie may have a greater temporal relevance than a textual phrase corresponding to a movie that was released two years prior. In another example, a textual phrase corresponding to a movie that is currently being shown at a theater may have a greater temporal relevance than a textual phrase corresponding to a movie that was previously showing (but is not longer showing) at the theater. Personal relevance is dependent on factors associated with the user, though such factors need not necessarily be preferences of the user. For example, a textual phrase corresponding to a location or region that is relatively near a geographical location or region of the user may have a personal relevance that is greater than a textual phrase corresponding to a location or region that is relatively far from the geographical location or region of the user. In another example, depending on a time of the day, a textual phrase corresponding to a coffee shop along a route between the user's home and the user's workplace may have a personal relevance that is greater than a textual phrase corresponding to a coffee shop that is closer to the user's home but in the opposite direction of the user's workplace.

In further accordance with this embodiment, the method further includes dynamically generating a designated textual phrase from the plurality of possible textual phrases to be included in the specified second slot based on the relevance of the designated textual phrase not being less than the relevance of each other possible textual phrase in the plurality of possible textual phrases. It will be recognized that the plurality of possible textual phrases need not be predetermined and/or static (e.g., fixed). For instance, each possible textual phrase of the plurality of possible textual phrases may be generated dynamically (e.g., on-the-fly). In an example implementation, generation logic 318 dynamically generates designated textual phrase(s) 344 from the possible textual phrases 346 based on the relevance of the designated textual phrase not being less than the relevance of the other possible textual phrases 346. Generation logic 318 provides the designated textual phrase(s) 344 to suggestion logic 304 for inclusion in the specified second slot.

It will be recognized that processing logic 300 may not include one or more of time logic 302, suggestion logic 304, interface 306, request analysis logic 308, content logic 310, assignment logic 312, identification logic 314, relevance logic 316, generation logic 318, and/or store 320. Furthermore, processing logic 300 may include modules in addition to or in lieu of time logic 302, suggestion logic 304, interface 306, request analysis logic 308, content logic 310, assignment logic 312, identification logic 314, relevance logic 316, generation logic 318, and/or store 320. Moreover, it will be recognized that request analysis logic 308 and/or generation logic 318 may be incorporated into a spoken language understanding (SLU).

Figure 4:
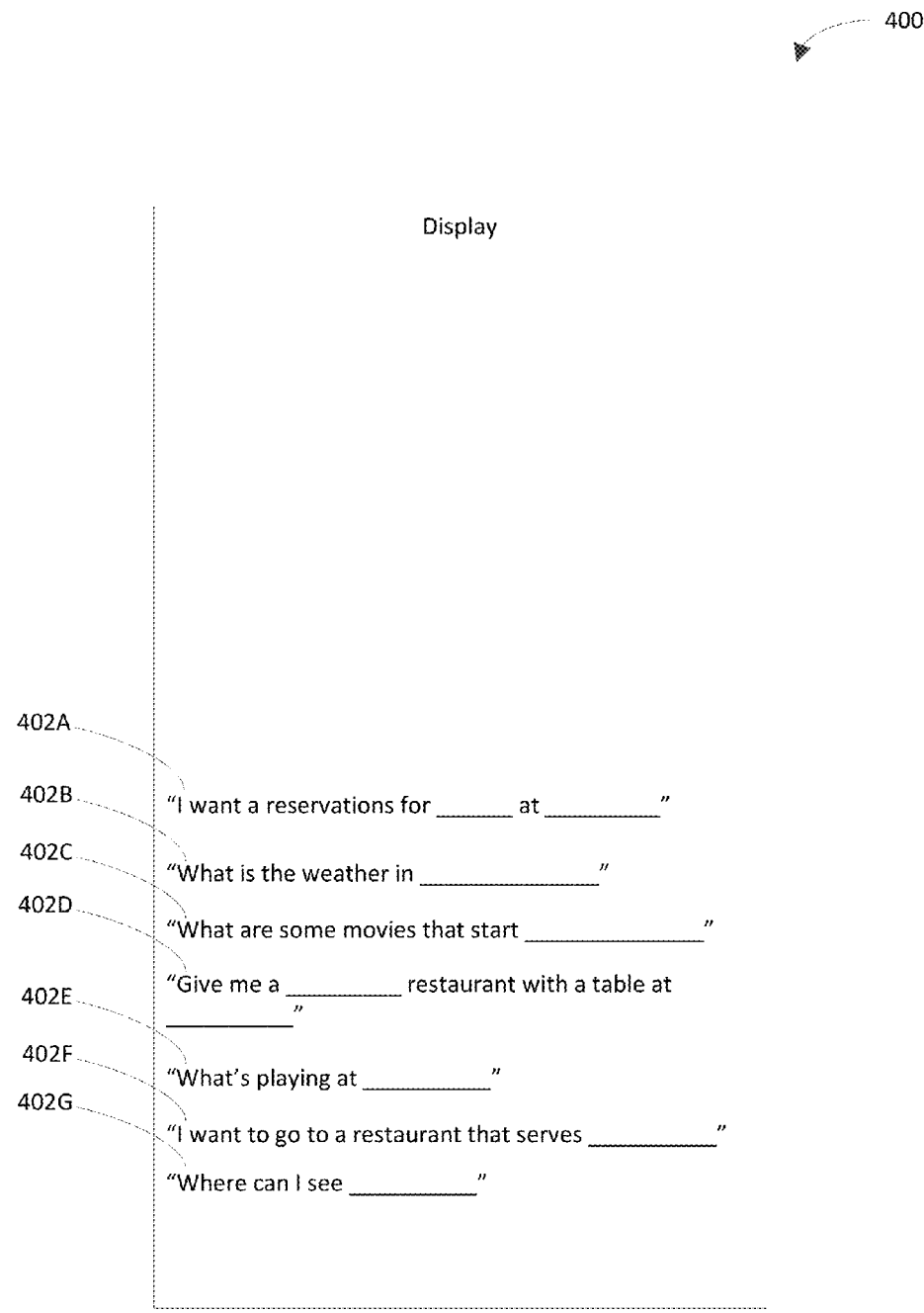
FIGS. 4-7 are example implementations of a display shown in FIG. 1 in accordance with embodiments.

FIGS. 4-7 are example implementations of a display shown in FIG. 1 in accordance with embodiments. As shown in FIG. 4, display 400 displays intent frames 402A-402G. Each of the intent frames 402B, 402C, 402E, 402F, and 402G includes a single carrier phrase and a single slot for illustrative purposes. Each of the intent frames 402A and 402D includes two carrier phrases and two corresponding slots for illustrative purposes. For instance, intent frame 402A reads "I want a reservation for _____ at _____". Accordingly, intent frame 402A includes a first carrier phrase of "I want a reservation for" and a second carrier phrase of "at". It will be recognized that each of the intent frames 402A-402G may include any suitable number of carrier phrases and any suitable number of slots. Each of the slots in the intent frames 402A-402G is represented as an underlined blank for illustrative purposes and is not intended to be limiting. It will be recognized that each of the slots may be represented in any suitable manner.

Figure 5:
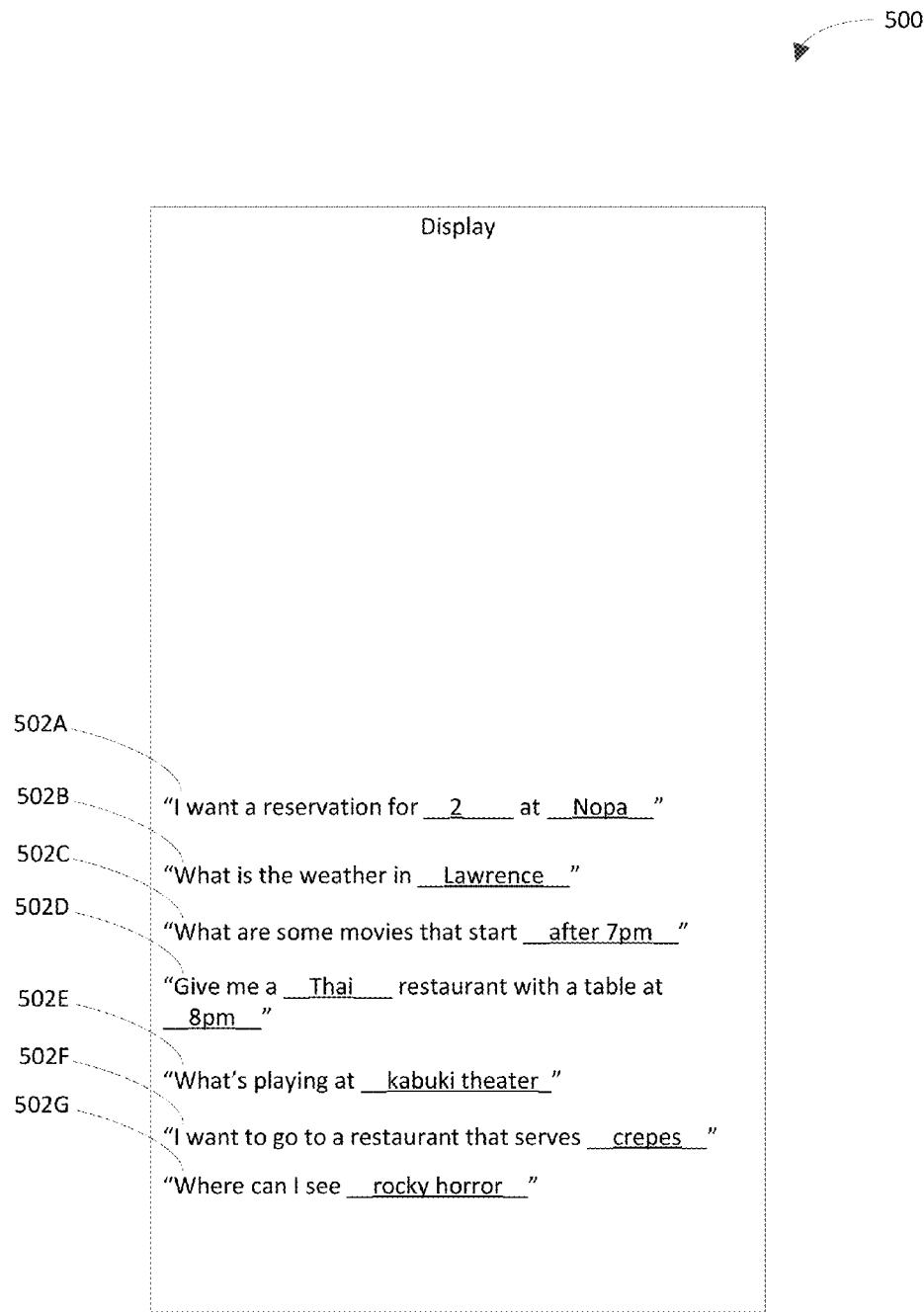

For instance, as shown in FIG. 5, display 500 displays intent frames 502A-502G, which include the same carrier phrases as intent frames 402A-402G shown in FIG. 4 for illustrative purposes. However, the slots in the intent frames 502A-502G are represented using underlined text, rather than underlined blanks. For instance, intent frame 402A reads "I want a reservation for 2 at Nopa". Accordingly, a first slot of intent frame 402A is represented using first underlined text of "2", and a second slot of intent frame 402A is represented using second underlined text of "Nopa".

Figure 6:
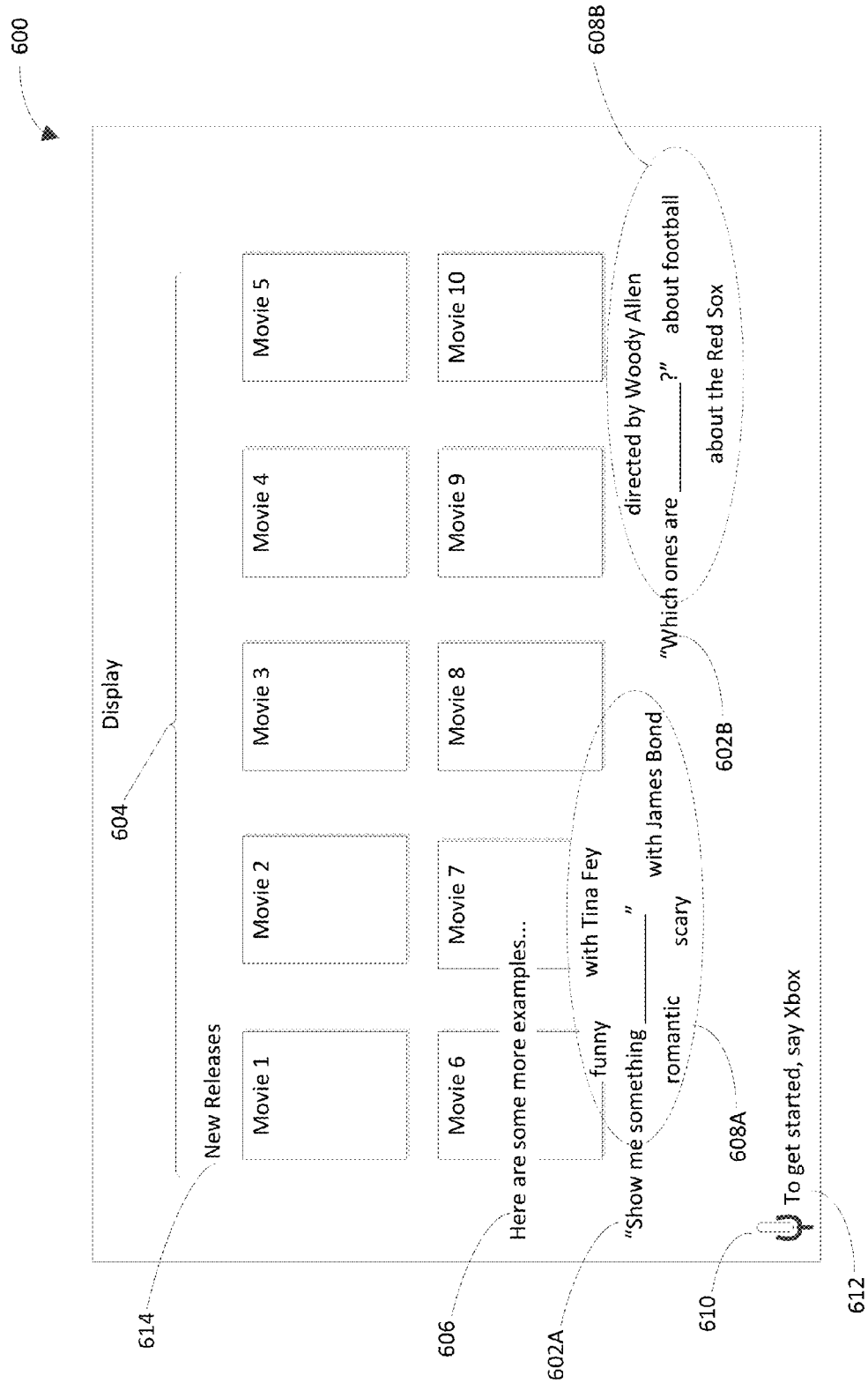

As shown in FIG. 6, display 600 displays icons 604. Each of the icons 604 represents a respective movie. Message 614 indicates that the movies represented by the icons 604 are new releases. For instance, a user may have requested to see new movies to cause display 600 to display the new releases. Message 606 indicates that some examples of requests that may be provided by the user are displayed by display 600. The examples of the requests are displayed as intent frames 602A and 602B.

Intent frame 602A reads "Show me something _____". Accordingly, intent frame 602A includes a carrier phrase of "Show me something" and a slot that is represented as an underlined blank. Multiple suggested textual phrases 608A are displayed proximate the slot. For instance, the multiple suggested textual phrases 608A may be displayed in a cloud (as shown), in a vertical list, in a horizontal list, in an array having multiple rows and multiple columns, etc. The multiple suggested textual phrases 608A may be displayed based on a request not being received by a processing system that includes display 600 since a time instance at which natural language functionality of the processing system is activated, though the scope of the example embodiments is not limited in this respect.

Each of the suggested textual phrases 608A includes text that may be used by the user to replace the slot. The multiple suggested textual phrases 608A are as follows: "funny", "with Tina Fey", "romantic", "scary", and "with James Bond". For instance, the user may provide a request of "Show me something funny", "Show me something with Tina Fey", etc. The carrier phrase and the suggested textual phrases 608A are intended to enable the user to extrapolate and extend the intent frame 602A in order to generate an arbitrary request that corresponds to an intent of the user. Thus, the user is not limited to the suggested textual phrases 608A. Rather, the user may replace the slot with any suitable textual phrase to indicate the intent of the user. Moreover, the user need not necessarily use the carrier phrase of "Show me something" in the user's request. This carrier phrase is provided merely as one example way to start a request to achieve an intent of the user. For instance, the user may provide a request such as "I sure would like to see a movie that stars Alec Baldwin", "Are there any comedies out now?", etc. Accordingly, intent frame 602A a starting point to indicate what the user might say in order to narrow the new releases to achieve the user's intent.

Intent frame 602B reads "Which ones are _____?" Accordingly, intent frame 602B includes a carrier phrase of "Which ones are" and a slot that is represented as an underlined blank. Multiple suggested textual phrases 608B are displayed proximate the slot. Each of the suggested textual phrases 608B includes text that may be used by the user to fill the slot. The multiple suggested textual phrases 608B are as follows: "directed by Woody Allen", "about the Red Sox", and "about football". The user need not necessarily use the carrier phrase of "Which ones are" or any of the multiple suggested textual phrases in a request that is elicited based on the intent frame 602B. For instance, rather than merely filling in the slot with the suggested textual phrase of "directed by Woody Allen", the user may provide a request of "Are any of these by Woody Allen?" in order to achieve the same intent.

It will be recognized that suggested textual phrases that are associated with a slot may be static or dynamic. A static suggested textual phrase is a suggested textual phrase that is stationary with respect to the slot with which the suggested textual phrase is associated. A dynamic suggested textual phrase is a suggested textual phrase that moves with reference to the slot with which the suggested textual phrase is associated. The multiple suggested textual phrases 608A and 680B are shown to be static suggested textual phrases in FIG. 6 for illustrative purposes, though it will be recognized that the multiple suggested textual phrases 608A and/or 680B may be implemented as dynamic suggested textual phrases. For example, the multiple suggested textual phrases 608A may be configured to rotate about (e.g., around) the slot that is included in the intent frame 602A. In another example, the multiple suggested textual phrases 608B may be configured to rotate about the slot that is included in the intent frame 602B. In one aspect, the multiple suggested textual phrases 608A and 608B may rotate clockwise. In another aspect, the multiple suggested textual phrases 608A and 608B may rotate counterclockwise. In yet another aspect, the multiple suggested textual phrases 608A may rotate clockwise, and the multiple suggested textual phrases 608B may rotate counterclockwise. In still another aspect, the multiple suggested textual phrases 608A may rotate counterclockwise, and the multiple suggested textual phrases 608B may rotate clockwise.

Display 600 displays an icon 610. For instance, icon 610 may indicate that natural language functionality is available with respect to the processing system that includes display 600 or that the natural language functionality is activated. Icon 610 may be selectable in some example embodiments to activate and/or deactivate the natural language functionality. A tip 612 is displayed proximate the icon 610. The tip 612 reads "To get started, say Xbox". For example, the user may provide a request of "Let's go to the Xbox", "I'd like to play the Xbox", etc. to change the context of the interaction with the processing system that includes display 600 or to start a new interaction. In accordance with this example, a request from the user that includes the phrase "Xbox" may indicate to the processing system that the user would like to start a new interaction with the processing system, starting at a highest level of a hierarchical function tree having multiple levels that correspond to respective functionality of the processing system.

Figure 7:
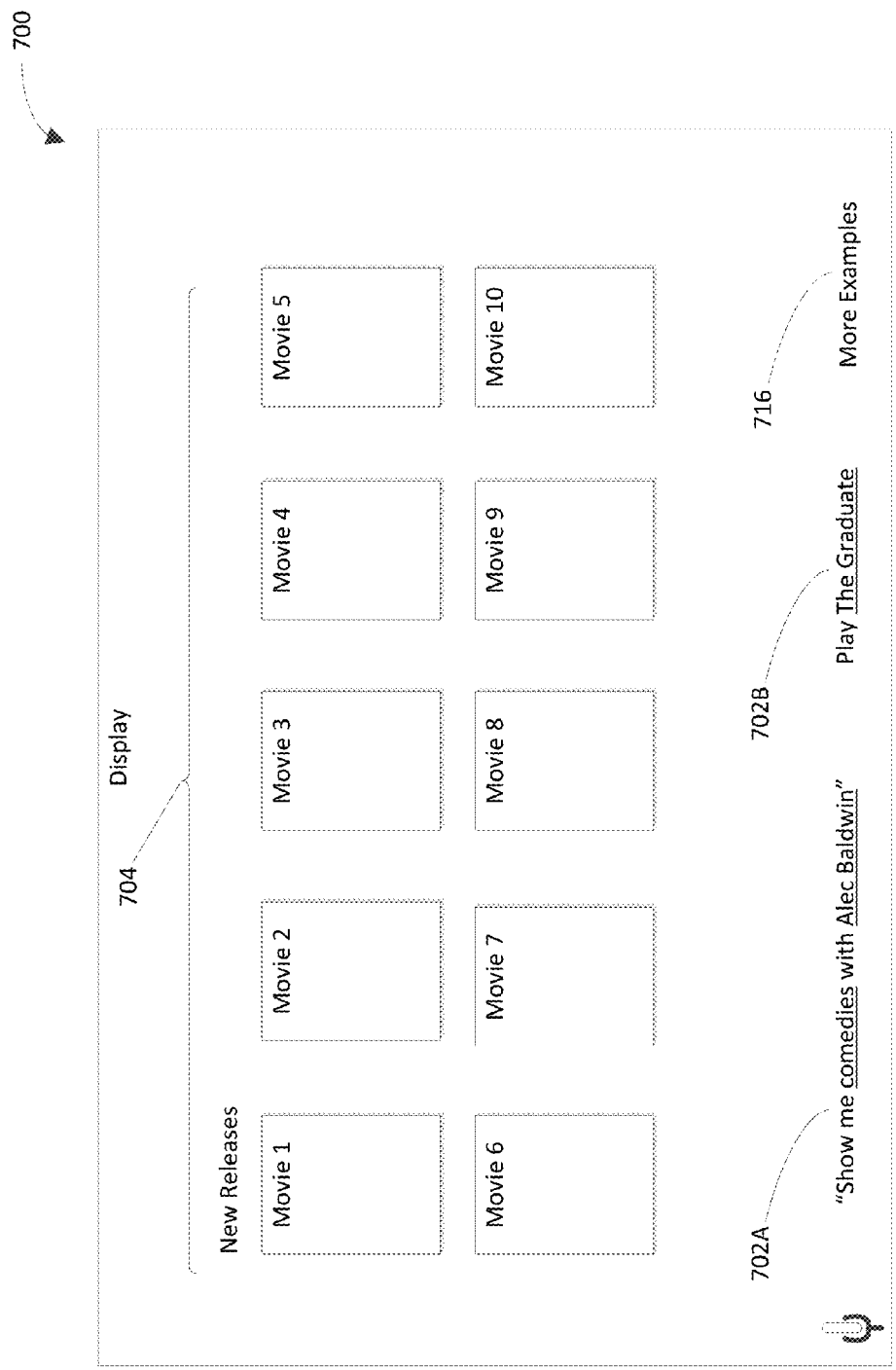

As shown in FIG. 7, display 700 displays icons 704. Each of the icons 704 represents a respective movie. Display 700 displays intent frames 702A and 702B. Intent frame 702A reads "Show me comedies with Alec Baldwin". Intent frame 702B reads "Play The Graduate". Intent frames 702A and 702B are shown to be displayed along a bottom portion of display 700 for illustrative purposes. It will be recognized that intent frames 702A and 702B may be displayed in another portion of display 700, including but not limited to along a top portion of display 700, overlaid on a right or left side of display 700, etc. It will be further recognized that intent frames, such as intent frames 702A and 702B, may be provided in accordance with an integrated contextual approach and/or in response to a request for help from a user. An integrated contextual approach is an approach in which a processing system is configured to provide intent frames for the user throughout the user's experience, rather than merely when the user requests assistance with regard to the natural language functionality of the processing system.

Display 700 displays a selectable message 716, which reads "More Examples". Selectable message 716 is selectable by the user to cause a processing system that includes display 700 to display other intent frames for the user. For example, the other intent frames may replace intent frames 702A and 702B. In another example, display 700 may display the other intent frames and intent frames 702A and 702B simultaneously. In yet another example, display 700 may display the other intent frames alternately with intent frames 702A and 702B.

It will be recognized that intent frames, such as intent frames 702A and 702B may be provided based on a contextual awareness of the processing system. For instance, the intent frames may be based on a state of an interaction of a user with respect to the processing system and/or information that is displayed to the user. For example, if a media searching and browsing application is being used to display results pertaining to movies that are relevant to an intent of the user and some of the movies are available in a high definition (HD) format, the processing system may suggest an intent frame of "Which ones are available in HD". However, if none of the movies are available in a HD format, the processing system may provide an alternate intent frame to narrow the results (e.g., "Which ones are rated PG?"). It will be further recognized that intent frames may be suggested based on predicted most likely next step(s) in an interaction of the user with the processing system. For instance, once the user has narrowed down to a few movie results, the processing system may generate intent frame(s) that promote actions such as play, add to queue, etc.

Processing logic 106, time logic 302, suggestion logic 304, interface 306, request analysis logic 308, content logic 310, assignment logic 312, identification logic 314, relevance logic 316, generation logic 318, and flowchart 200 may be implemented in hardware, software, firmware, or any combination thereof.

For example, processing logic 106, time logic 302, suggestion logic 304, interface 306, request analysis logic 308, content logic 310, assignment logic 312, identification logic 314, relevance logic 316, generation logic 318, and/or flowchart 200 may be implemented as computer program code configured to be executed in one or more processors.

In another example, processing logic 106, time logic 302, suggestion logic 304, interface 306, request analysis logic 308, content logic 310, assignment logic 312, identification logic 314, relevance logic 316, generation logic 318, and/or flowchart 200 may be implemented as hardware logic/electrical circuitry. For instance, in an embodiment, processing logic 106, time logic 302, suggestion logic 304, interface 306, request analysis logic 308, content logic 310, assignment logic 312, identification logic 314, relevance logic 316, generation logic 318, and/or flowchart 200 may be implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
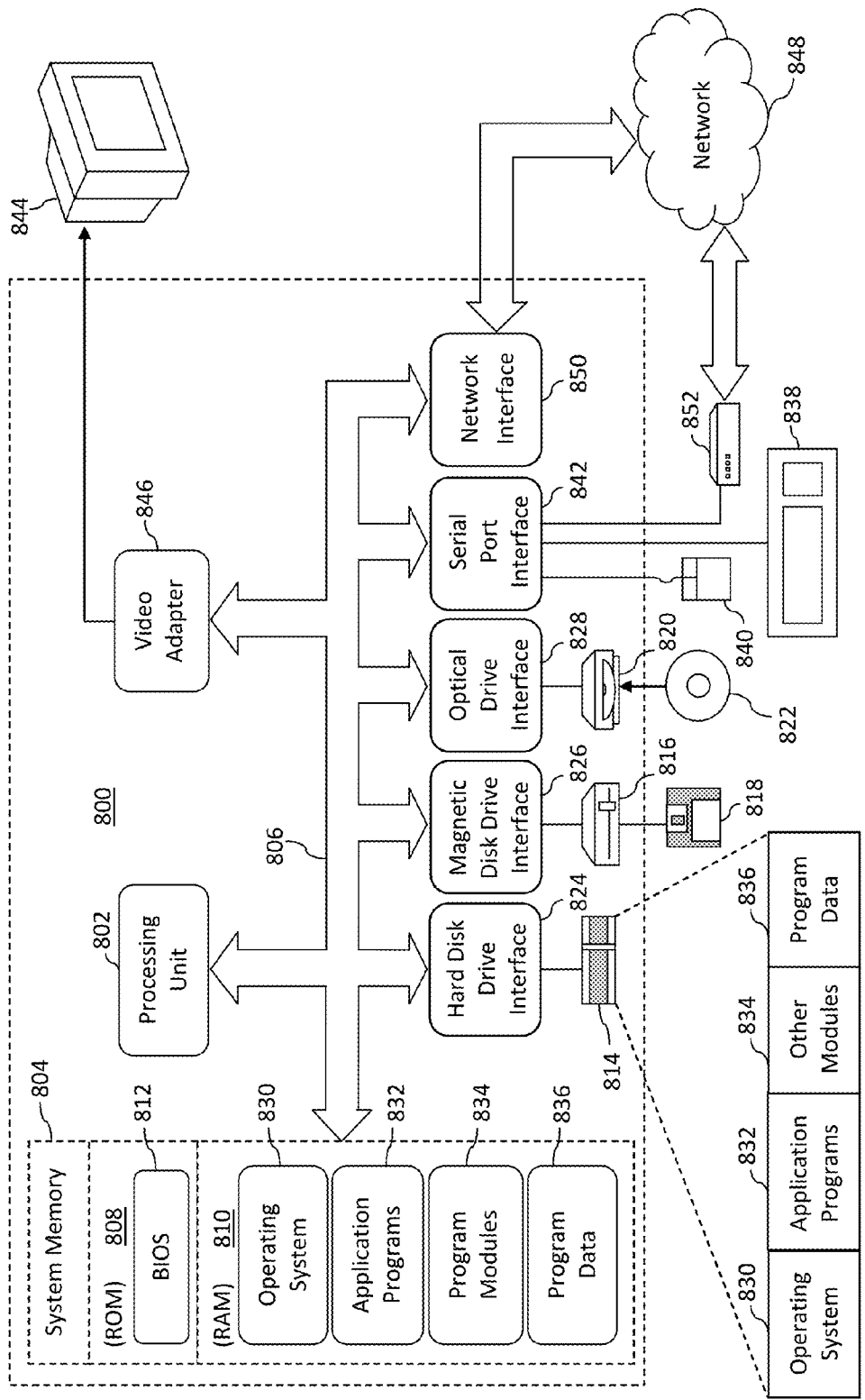
FIG. 8 depicts an example computer in which embodiments may be implemented.

FIG. 8 depicts an example computer 800 in which embodiments may be implemented. Processing system 100 shown in FIG. 1 (or any one or more subcomponents thereof shown in FIGS. 3-8) may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing processing logic 106, time logic 302, suggestion logic 304, interface 306, request analysis logic 308, content logic 310, assignment logic 312, identification logic 314, relevance logic 316, generation logic 318, and/or flowchart 200 (including any step of flowchart 200), as described herein.

A user may enter commands and information into the computer 800 through input devices such as keyboard 838 and pointing device 840. Other input devices (not shown) may include a microphone, joystick, game pad, satellite dish, scanner, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable medium" are used to generally refer to media such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media. Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A processing system comprising:
   at least one element including at least one of (a) one or more processors or (b) hardware logic/electrical circuitry;
   activation logic, implemented using the at least one element, configured to determine whether natural language functionality of the processing system is activated, the natural language functionality for enabling the processing system to interpret natural language requests;
   suggestion logic, implemented using the at least one element, configured to generate one or more intent frames in response to a determination that the natural language functionality of the processing system is activated, each of the one or more intent frames including at least one carrier phrase and at least one slot;
   an interface configured to provide the one or more intent frames for perception by a user;
   assignment logic, implemented using the at least one element, configured to assign a plurality of probabilities to a plurality of respective possible intent frames, each probability indicating a likelihood that the user is to select the corresponding possible intent frame if the corresponding possible intent frame is suggested to the user; and
   identification logic, implemented using the at least one element, configured to identify a high-probability intent frame from the plurality of possible intent frames, the high-probability intent frame being assigned a probability that is not less than a probability that is assigned to each other possible intent frame in the plurality of possible intent frames,
   the suggestion logic configured to include the high-probability intent frame in the one or more intent frames based on the high-probability intent frame being assigned a probability that is not less than a probability that is assigned to each other possible intent frame in the plurality of possible intent frames.

2. The processing system of claim 1, wherein the interface is configured to suggest the one or more intent frames to the user to elicit a request from the user.

3. The processing system of claim 1, wherein the interface is configured to provide at least one of a visual representation or an audio representation of the one or more intent frames for perception by the user.

4. The processing system of claim 1, wherein the suggestion logic is configured to generate at least one of the one or more intent frames based on one or more topics that are accessed by the user with respect to a software application.

5. The processing system of claim 1, wherein the interface is configured to provide the one or more intent frames for perception by the user based on a request not being received by the processing system since a time instance at which the natural language functionality of the processing system is activated.

6. The processing system of claim 1, wherein the interface is configured to display at least one dynamic suggested textual phrase that moves with reference to a first slot with which the dynamic suggested textual phrase is associated, the first slot being included in a first intent frame of the one or more intent frames.

7. The processing system of claim 1, wherein the suggestion logic is configured to provide a plurality of suggested textual phrases to replace a designated slot in a specified intent frame that is included in the one or more intent frames, the plurality of suggested textual phrases configured to rotate about the designated slot clockwise or counterclockwise.

8. A processing system comprising:
a memory for storing executable program code; and
a processor, functionally coupled to the memory, the processor being responsive to computer-executable instructions contained in the program code and operative to:
determine whether natural language functionality of the processing system is activated, the natural language functionality for enabling the processing system to interpret natural language requests;
generate one or more intent frames in response to a determination that the natural language functionality of the processing system is activated, each of the one or more intent frames including at least one carrier phrase and at least one slot, and each of the one or more intent frames indicating a form of request that is supported by the natural language functionality of the processing system;
provide a plurality of suggested textual phrases to replace a designated slot in a specified intent frame that is included in the one or more intent frames; and
cause the one or more intent frames to be displayed.

9. The processing system of claim 8, wherein the processor is further operative to suggest the one or more intent frames to the user to elicit a request from the user.

10. The processing system of claim 8, wherein the processor is further operative to provide an audio representation of the one or more intent frames.

11. The processing system of claim 8, wherein the processor is further operative to generate at least one of the one or more intent frames based on one or more topics that are accessed by the user with respect to a software application.

12. The processing system of claim 8, wherein the processor is further operative to provide the plurality of suggested textual phrases based on a request not being received by the processing system since a time instance at which the natural language functionality of the processing system is activated.

13. The processing system of claim 8, wherein the processor is further operative to cause at least one dynamic suggested textual phrase that moves with reference to a first slot with which the dynamic suggested textual phrase is associated to be displayed, the first slot being included in a first intent frame of the one or more intent frames.

14. The processing system of claim 8, wherein the plurality of suggested textual phrases is configured to rotate about the designated slot clockwise or counterclockwise.

15. A processing system comprising:
a memory for storing executable program code; and
a processor, functionally coupled to the memory, the processor being responsive to computer-executable instructions contained in the program code and operative to:
determine whether natural language functionality of the processing system is activated, the natural language functionality for enabling the processing system to interpret natural language requests;
generate one or more intent frames in response to a determination that the natural language functionality of the processing system is activated, each of the one or more intent frames including at least one carrier phrase and at least one slot, and each of the one or more intent frames indicating a form of request that is supported by the natural language functionality of the processing system;
generate at least one of the one or more intent frames based on one or more topics that are accessed by the user with respect to a software application; and
cause the one or more intent frames to be displayed.

16. The processing system of claim 15, wherein the processor is further operative to suggest the one or more intent frames to the user to elicit a request from the user.

17. The processing system of claim 15, wherein at least one of the one or more intent frames includes at least one slot that is audibly represented using at least one of one or more spoken words or one or more tones.

18. The processing system of claim 15, wherein the processor is further operative to provide at least one of the one or more intent frames for perception by the user based on a request not being received by the processing system since a time instance at which the natural language functionality of the processing system is activated.

19. The processing system of claim 15, wherein the processor is further operative to cause at least one dynamic suggested textual phrase that moves with reference to a first slot with which the dynamic suggested textual phrase is associated to be displayed, the first slot being included in a first intent frame of the one or more intent frames.

20. The processing system of claim 15, wherein the processor is further operative to provide a plurality of suggested textual phrases to replace a designated slot in a specified intent frame that is included in the one or more intent frames, the plurality of suggested textual phrases configured to rotate about the designated slot clockwise or counterclockwise.

* * * * *